United States Patent

[11] 3,617,873

[72] Inventors Glenn W. Murray
Irvine;
Bruce A. Kaufman, Los Angeles, both of Calif.
[21] Appl. No. 887,153
[22] Filed Dec. 22, 1969
[45] Patented Nov. 2, 1971
[73] Assignee North American Rockwell Corporation

[54] SYSTEM FOR GENERATING SWITCHING WINDOW FOR PLATED WIRE
3 Claims, 4 Drawing Figs.

[52] U.S. Cl. .......... 324/34 R, 340/174 TC, 340/174 PN, 340/174 TF, 340/174 GA
[51] Int. Cl. .......... G01r 33/00
[50] Field of Search .......... 324/34, 34 MC; 340/74 PW, 174 TC, 174 TF, 174 GA

[56] References Cited
UNITED STATES PATENTS
3,460,109 8/1969 Veneziano .......... 324/34 MCT OTHER REFERENCES
Gersbach; J., Automatic Schmoo Plotter; IBM Tech. Dis. Bull.; Vol. 9, No. 7, Dec. 1966; pp. 882- 883 (Copy in 324-34)

*Primary Examiner*—Rudolph V. Rolinec
*Assistant Examiner*—R. J. Corcoran
*Attorneys*—L. Lee Humphries, H. Fredrick Hamann and Robert G. Rogers

ABSTRACT: Counters are used to sweep word and bit currents for a plated wire sample in a synchronous incremental manner over a matrix in an X-Y plane. The output from the plated wire at each X-Y coordinate is compared with a reference voltage. If the output voltage is less than the reference voltage, a dot is generated on a display oscilloscope. If the voltage is in excess of the reference voltages, the dot is blanked out. The sweeping continues until the wire has been tested for all values of word and bit current. The switching window display (area of blanked dots) on the oscilloscope is thereby generated automatically.

*INVENTORS*
GLENN W. MURRAY
BRUCE A. KAUFMAN
BY Robert G. Rogers
ATTORNEY

INVENTORS
GLENN W. MURRAY
BRUCE A. KAUFMAN
BY Robert G. Rogers
ATTORNEY

SYSTEM FOR GENERATING SWITCHING WINDOW FOR PLATED WIRE

BACKGROUND OF THE INVENTION

1. Field of the Invention

The invention relates to a system for generating a display of the response to a plated wire to word and bit currents and, more particularly, to such a system in which the word and bit currents are swept in a synchronous incremental manner over a matrix of values for indicating the plated wire responses to the word and bit current combinations.

2. Background of the Invention

The evaluation of plated wire memory devices presents unique testing problems not normally encountered in evaluating conventional (core) memories. In order to test a plated wire of given characteristics, a very large number of parameters must be considered and compromises made between various operational requirements. The primary variables that must be considered include word current (amplitude and tolerance), bit current (amplitude and tolerance), output amplitude, and wordstrap geometry (width and spacing). All of the variables must be considered in the context of rather complex test programs which take into account such factors as the past magnetic history of the memory element, the effect of exercising memory cells adjacent to the one under test, and the various "creep" modes that must be considered for the particular application intended.

An evaluation such as described above involves a large quantity of data consisting of many variables measured over a wide range of values under complex test conditions. One systematic approach to the problem is the generation of a "-switching wondow" for the wire. The term "switching window" means a display of the voltage output response to word and bit current inputs. The generation of the switching window involves fixing the workshop geometry, word and bit current tolerances, and output voltage amplitude. The word and bit currents ($I_w$ and $I_b$ ) are then varied over a wide range of values in executing a specified test program, and the combinations of word and bit current which generate the required output are noted. The $I_w$–$I_b$ values are plotted in an X-Y plane to show a "window" in which satisfactory operation may be obtained. In other words, certain values of word and bit currents may be used to generate a required output voltage from the plated wire. The combinations can be used are within the switching window illustrated by the plot. Switching windows may then be generated for other wordstrap geometries, current tolerances, or output voltages. The windows may be used as a basis for evaluating the performance of the wire with these variations.

Although useful from an evaluation standpoint, the acquisition of the data required to generate a switching window is difficult and time consuming. A system is preferred in which an oscilloscope or similar means is used to display the switching window of a plated wire sample as it is generated automatically. The system described herein satisfies the requirements of a preferred system.

SUMMARY OF THE INVENTION

Briefly the system comprises means for automatically generating a display of the response of plated wire to changes in parameters over a broad range of operating points. The system includes means for generating a display of the plated wire switching window, i.e., a parametric plot in the $I_{word}$–$I_{bit}$ current plane of the area which satisfies the specified test conditions of the plated wire in terms of switching output voltages from the wire.

The test pattern for the plated wire is run repetitively for incremented values of word and bit currents. The switching output voltage from the wire at each point is stored and compared with a reference voltage. The output from the comparison means controls an oscilloscope or other means for generating a display of the switching window.

The system may be used to determine optimum operating points for a given wire in terms of array geometry and output voltage requirements. It is also possible to evaluate the effectiveness of various array geometries by observing the manner in which the switching window shifts with a change in plated wire bit geometry. In addition, the system may be used to determine the effects of temperature on the operating margins of plated wire and to plot unipolar and bipolar creep thresholds.

Therefore, it is an object of this invention to provide a system for automatically generating a display of the switching window or other operational parameters of a plated wire sample.

It is another object of this invention to provide a system for consecutively increasing word and bit currents and for using the resulting generated voltage output from the plated wire to form a display of the response of the wire to the various combinations of word and bit currents.

It is another object of this invention to generate a switching window display of a plated wire by plotting the output voltage response to changes in the word and bit currents.

A further object of this invention is to provide a system and a process for determining the optimum operating points for a plated wire in terms of array geometry and output voltage requirements.

A still further object of this invention is to provide a digitally controlled system for generating a plated wire switching window display automatically without the difficult and time-consuming processes generally required.

A still further object of the invention is to provide a plated wire switching window generation system which can be used to determine the effects of temperature on the operating margins of the plated wire.

These and other objects of the invention will become more apparent when taken in connection with the description of the drawings, a brief description of which follows:

DESCRIPTION OF THE PREFERRED EMBODIMENTS

Figure 1:
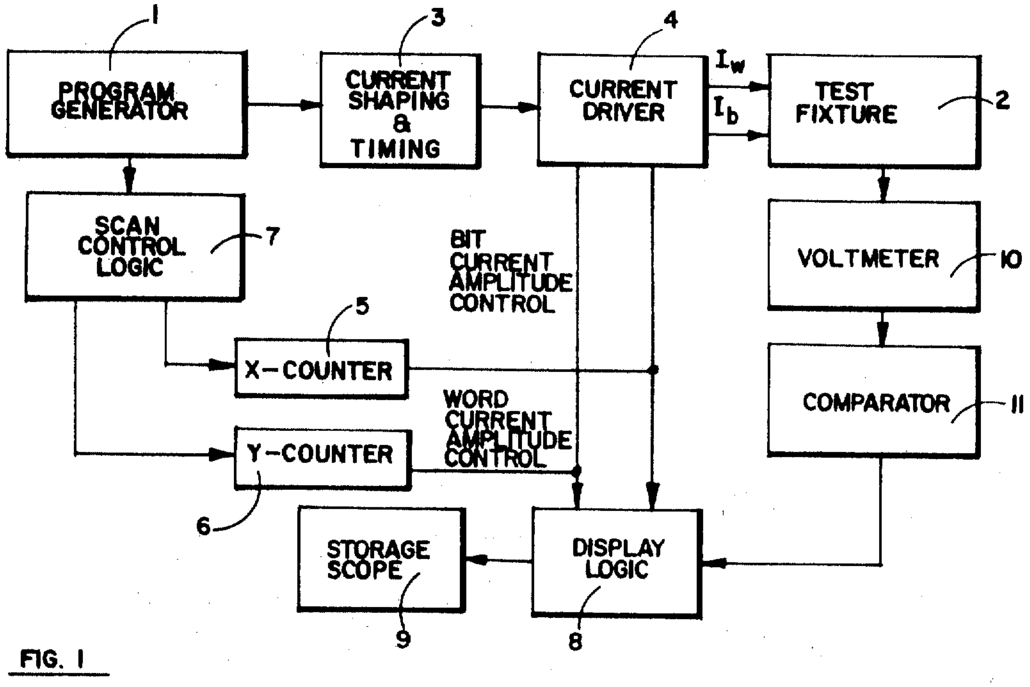
FIG. 1 is a block diagram of a switching window display system.

The FIG. 1 system comprises a program generator 1 for controlling the test sequence of a plated wire sample held by test fixture 2. The program generator is programmed to provide a pattern of output pulses, or signals, in accordance with predetermined sequences and relationships. For example, the patterns may be generated to test the plated wire for adjacent bit disturb, interleave disturb, creep, crawl, or nondestruct readout (NDRO).

The output signal from the generator passes through the shaping and timing circuit 3. As indicated by the name, the circuit comprises shaping circuits and other means for placing the output signals from the delay circuits generator into the desired form. For example, the time relationship, amplitude or slope of a pattern of pulses may be modified to test the response of the wire to high and low tolerances of the drive currents. In one embodiment, up to 10 different pulses may be generated by timing and shaping controls. The exact configuration of the circuit 3 is dependent to a certain extent on the configuration of generator 1. In certain systems, the circuit could be omitted, particularly where the generator included means for modifying the output signals.

The adjusted output pulses from circuit 3 actuate current driver circuit 4 for generating word and bit current pulses, $I_w$ and $I_b$, to the plated wire sample in test fixture 2. The current driver circuit may be comprised of a plurality of amplifying devices controlled by logic gates connected to receive the output from circuit 3. A particular device for generating a current pulse having a distinct amplitude controlled by a digital input is programmed by the inputs from circuit 3 and the inputs from X and Y counters 5 and 6 respectively. The current pulses are varied over a wide range of amplitudes as necessary to test the plated wire.

Program generator 1 also provides an output signal to scan control logic 7, which generates counting pulses to the X and Y counters. The pulses are generated to enable the FIG. 1 system to sweep the currents, $I_w$ and $I_b$, in a synchronous manner over a current matrix in an X–Y plane. Logic 7 could be implemented in one embodiment by a counter and decode logic having X and Y outputs.

The X counter 5 and Y counter 6 each receive count pulses from scan control logic 7. At each count, the counters provide output signals to current driver circuit 4. The outputs enable logic and gates and amplifying devices in the driver circuit for controlling the amplitudes of the word and bit currents to a value proportional to the digital input from counters 5 and 6. The counters can be controlled to maintain the current pulses at any X–Y coordinate for an indefinite period of time by properly programming generator 1. Such control is required, for example to execute a creep pulse pattern having many disturbs.

It is pointed out that the counters in the system as described and shown in FIG. 1 are digital. However, an analog ramp generator could have been used in lieu of the counters to slew the amplitudes of the word and bit currents. The ramp generator was not as practical as the digital counters due to the requirement indicated above that the duration at a given level of current may be required to be held constant from microseconds to a few seconds. That capability is particularly important in plated wire testing since many patterns require disturb bursts of a million or more pulses which cannot be achieved practically using a ramp generator.

The X and Y counter outputs are also connected to display logic 8 which controls the scan sequence of the storage oscilloscope 9. Each X and Y output is decoded by logic 8 as an X–Y coordinate. The decoded output directs the beam of the oscilloscope to the particular X–Y coordinate. The oscilloscope trace is synchronized with the variation in the currents applied to the plated wire under test.

The storage oscilloscope 9 displays the test responses of the wire to various word and bit current combinations. The oscilloscope is a convenient means for displaying the responses since the display is quickly available and can be easily erased for a subsequent test. Photographs of the response can be taken if desired to preserve the results. However, other displays or storage devices can also be used within the scope of the invention. A commercially available X–Y plotter could plot the test results so that a permanent record would be available. In the usual case, a visual indication such as provided by the oscilloscope is sufficient.

In operation, after a sequence of write and disturb pulses, current driver 4 is directed to generate read pulses into the plated wire sample. The output voltage ($e_0$) ) of the wire for each read pulse is measured and stored by a high-speed voltage meter device 10. In one embodiment, the pulse is sampled and stretched. The sampled voltage pulse ($e_0$) is compared in comparator circuit 11 with a reference voltage ($e_r$) to determine the conformance of the voltage to predetermined limits. Logic is also included within the comparator for allowing read comparisons on negative and positive outputs for certain tests. Reference voltages for both upper and lower limits are provided within comparators for purposes of determining the value of the output voltage relative to the reference voltage. In the usual case, the voltages are DC voltages.

If the output voltage is in excess of the reference voltage or within the predetermined limits, depending on the test being conducted, comparator 11 provides an output signal which blanks the beam oscilloscope 9. When the beam is blanked out at the particular X–Y coordinate involved, no dot appears on the oscilloscope. On the other hand, if the output voltage is less than the reference voltage or outside the predetermined limits, a dot appears at the X–Y coordinate being tested. As a result, after the complete X–Y scan has been made, an operator can view the oscilloscope to see where the pattern of dots ends and the window (not dots) begins. The undotted space is called the switching window of the wire. Stated alternately, the FIG. 1 system generates a switching window display of the wire by blanking out an oscilloscope display for those current values which can be satisfactorily used in operating a plated wire memory using the plated wire sample being tested for the test conditions employed.

The operator compares the switching window against the requirements for the wire. The oscilloscope could be marked by an overlay to indicate the passage or failure of the wire to the test. If the switching window conforms to predetermined, or desired, limitations, the wire is passed and a new sample is placed in the test fixture for test.

Figure 2:
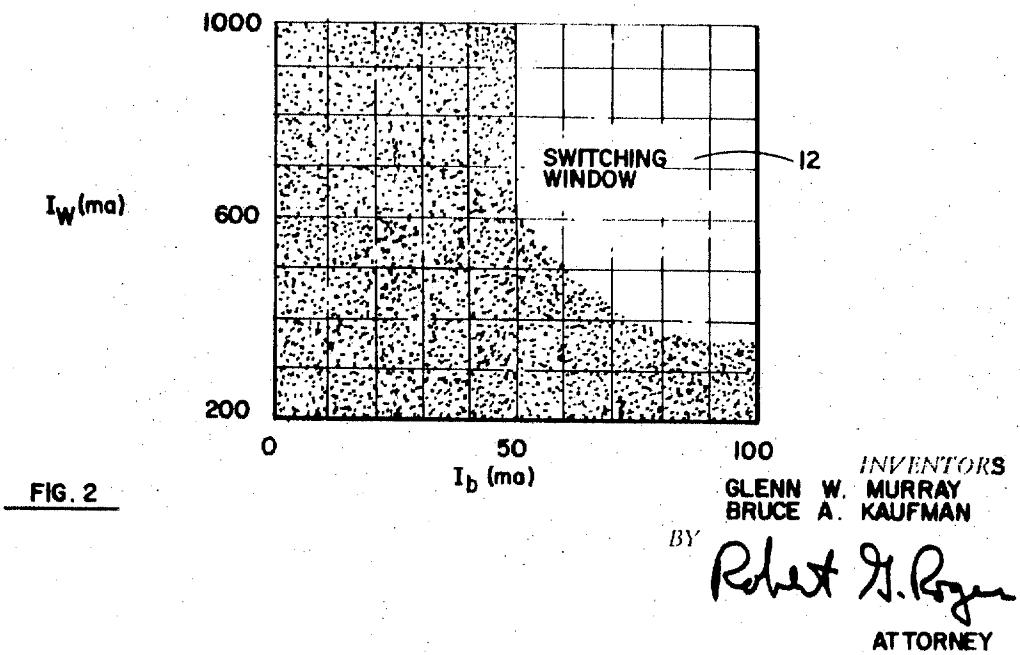
FIG. 2 is one example of a switching window for various word and bit current values.

FIG. 2 is an illustration of a typical plotted wire switching window. The switching window 12 has been labeled for convenience. As shown by the figure, for bit currents over the range of 50–100 ma. and word currents over a range of 300–1,000 ma., the plated wire sample generated an output voltage within the prescribed limits. For example, for a bit current of 80 ma. and a word current of 700 ma., the oscilloscope beam was blanked to indicate that the output voltage was within the prescribed voltage limits.

The operation of the system for testing a wire sample is begun by depressing a start button on the program generator 1. A clock pulse is generated and the X and Y counters are cleared to zero. The zero count is decoded to provide X AND Y positioning voltages to locate the oscilloscope beam. Initially, the beam is positioned at the lower left-hand corner of the X–Y matrix representing $I_wI_b$=0 ma. FIG. 2 was taken for the specific case in which $I_w$=200 ma.

The counts are also decoded to control the amplitude of the drive currents. As indicated above, for initial count of zero, the amplitudes of both currents are also zero. At this time, the test sequence in the programmer is run for values of zero word and bit currents. The test is typically a worst case memory element test and includes a write sequence, a disturb sequence and a read sequence for both the stored "1" and "0" states. After the test sequence has been completed, the sequence is repeated with only the X counter incremented. This is done for 64 counts at which time the X counter is cleared to zero and the Y counter is incremented and the X scan repeated. When the maximum X and Y counts representing the maximum currents have been reached, both counters are set to zero and the test is completed.

In an example test of a worst case program, the programmer is set to generate a test sequence consisting of writing information into bit positions of a plated wire with high tolerances word and bit currents, followed by writing information into the same bit positions by write current pulses of opposite polarity. The opposite polarity pulses are low tolerances word and bit currents. Thereafter, a disturb program of adjacent bit disturb is executed. An interleave test is executed with high tolerance currents with readout accomplished using a low tolerance word current.

In one case, a test was conducted using a 27 mil. wide single turn wordstrap on 50 mil. centers with an output requirement of 5 mv. The switching window was plotted in terms of nominal word and bit currents. By viewing the switching window display, values of the word and bit currents required to generate the output voltage under worst case tolerances could easily be seen. It was seen that for a word current of 700 ma. and a bit current of 45 ma., an output of 5 mv. occurred. For a plated wire using a 10 mil., 2-turn wordstrap with a 5 mil. gap on 50 mil. centers, the nominal operating currents for a 5 mv. output were seen to be $I_w$=500 ma. and $I_b$=40 ma. By using the FIG. 1 system, therefore, it is possible to establish operating currents for several area geometries in terms of a required output voltage and/or current tolerances.

The specific example described above indicated operating currents necessary to obtain a specified voltage output for two different area geometries. However, it is often required to define the operational capability of wire in terms of output voltage in a specified array geometry. This is of particular value in making tradeoff evaluations between operating point and output voltage. Since three variables are involved in such an analysis, the relationship between them may be represented by a three-dimensional surface in a space defined by $I_{word}$, $I_{bit}$ and output voltage. A convenient way of representing such a relationship in two dimensions is to map the surface onto the $I_{word}$—$I_{bit}$ plane in terms of constant output voltage contours. It is possible to generate such a mapping by using the switching window display system. This may be accomplished by using the upper and lower limit discrimination capability provided by the comparator 11 of the system. For example, if the lower limit is set at 2 mv. and the upper limit at 4 mv., the edges of the window generated will represent a 2 mv. constant output voltage contour in the $I_{word}$—$I_{bit}$ plane. The lower and upper limit discrimination settings can then be advanced to 6 and 8 mv. respectively and the window generated under these conditions superimposed over the first. In this manner, it is possible to map a series of constant voltage contours on the $I_{word}$—$I_{bit}$ plane. A display of this nature provides a comprehension analysis of wire performance in a single display allowing a continuous evaluation of output voltage with operating point.

Figure 3:
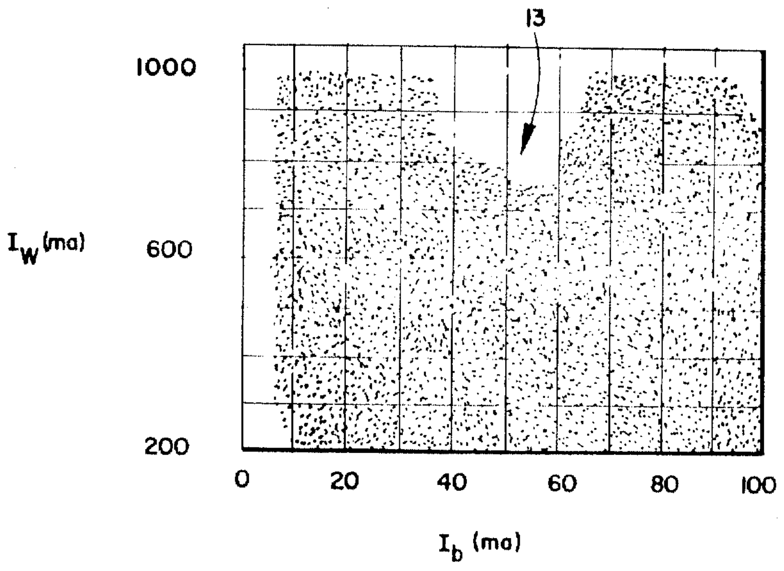
FIG. 3 is a plated wire switching window showing the effects of rotational stress on the switching window of the wire.

In addition to establishing and transferring operating points, the switching window of a wire also provides a very useful monitor for observing the influence of environmental effects, such as stress and temperature, on the operation of the wire. The influence of various environmental factors on plated wire operation is commonly approached by subjecting the wire to the environment in question while observing the output voltage from a worst case test program. The difficulty with this technique is that only operating tolerances are considered and no knowledge is gained of the influence of the environment on actual operating margins. Using a worst case test program and observing the resulting output may indicate very little change as a result of some environmental factor but the actual operating margins may have been reduced to the point where operation is on the verge of being affected seriously. The use of a switching window for this sort of evaluation provides a much greater visibility with respect to how the wire has been influenced by its environment as to reduction in margins and potential failure modes. An example of the value of this approach is illustrated in FIG. 3. FIG. 3 is a 4 mv. window 13 of a wire which has a 7 mv. output at a nominal operating point of $I_w$=800 ma. and $I_b$=50 ma.

Although developed primarily for displaying the operational window of plated wire in terms of usable values of word and bit current, the system allows great flexibility in the implementation of measurements of various parameters of plated wire. Essentially any measurement which may be resolved with an output amplitude decision can be implemented within the program and driver capability of the system. In the following examples, several applications are described that illustrate the versatility of this system in characterizing various aspects on plated wire operation.

Figure 4:
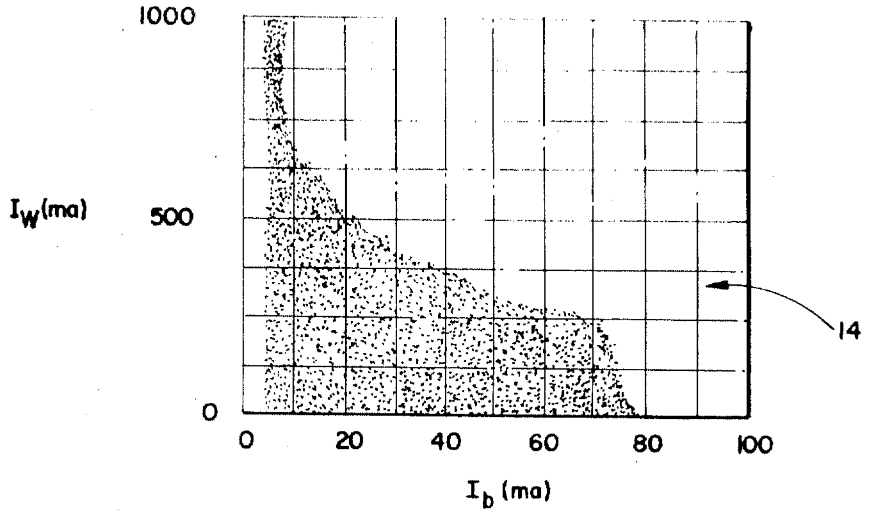
FIG. 4 is a plated wire switching window showing the unipolar creep threshold of a plated wire sample.

A characteristic of significance in most applications of plated wire is the creep threshold of the wire. This threshold is usually defined as the locus of values of bit and word current applied in a repetitive write mode required to reduce the previously stored information to some specified percentage of its undisturbed value. A display of such a creep threshold may be generated by reprogramming the system to apply a test sequence to the wire consisting of a fixed amplitude repeated write (history), a single fixed write of the opposite polarity, a variable amplitude repeated write and a fixed read. The discriminator level is then set to a voltage corresponding to some specified reduction in stored information, and the disturbing word and bit currents are scanned through a range of values. This results in a plot 12 of the creep threshold being generated on the storage oscilloscope. An example of a unipolar creep threshold is given in FIG. 4. As $I_b$ increases to approximately 75 ma., for a decreasing $I_w$, the output voltage is seen to be in excess of a reference voltage.

We claim:

1. A process for automatically generating a display of the response of a plated memory wire to drive currents, said process comprising the steps of, applying word and bit drive currents to test the magnetic characteristics of said plated memory wire, sequentially changing the amplitudes of said word and bit drive currents over a matrix of values in an X–Y plane, measuring the output voltage from said wire for each value of the word and bit drive currents, comparing the output voltage with a reference voltage to determine the difference between the output voltage and the reference voltage, using the results of said comparison to control an oscilloscope display, if said output voltage is less than the reference voltage, a dot is generated by the scope which corresponds to a particular X–Y coordinate, if the voltage is in excess of the reference voltage, the dot on said scope is blanked out for that particular X–Y coordinate, said process being continued until response of said wire has been measured and a display generated for each X–Y coordinate, at the completion of said process, said display indicating the switching window of the plated wire being tested.

2. The process recited in claim 1 wherein the output voltage is compared with reference voltages representing upper and lower voltage limits for testing the output voltage response from the wire over the X–Y matrix plane.

3. The process recited in claim 1 wherein the reference voltage is set to a value corresponding to a predetermined reduction in output voltage representing a lower operating limit, said wire is tested through a range of drive current values by applying inversely changing word and bit currents, the output of the wire is compared with said reference voltage and the results used to plot the creep threshold of said wire.